Feb. 15, 1966

R. A. PITKIN ETAL 3,235,144

MEASURING DISPENSER FOR CONTAINERS

Filed June 22, 1964

INVENTORS
RICHARD A. PITKIN
STANLEY T. BEALE
BY

Vernon D. Beehler

ATTORNEY

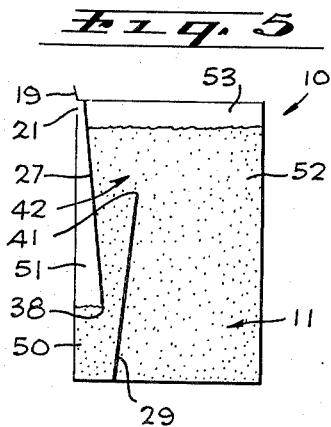
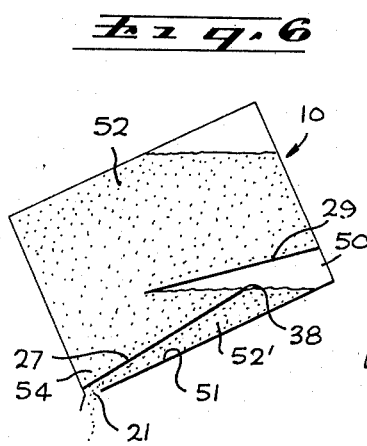
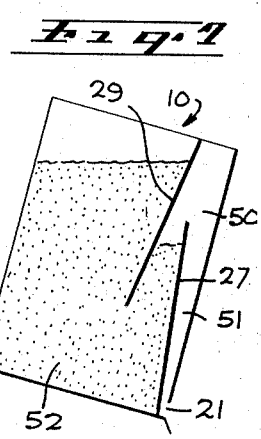
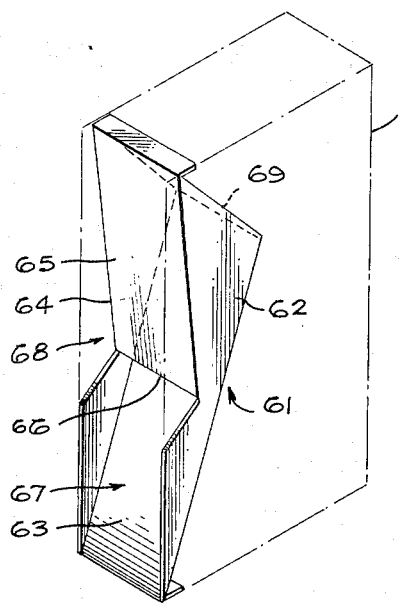
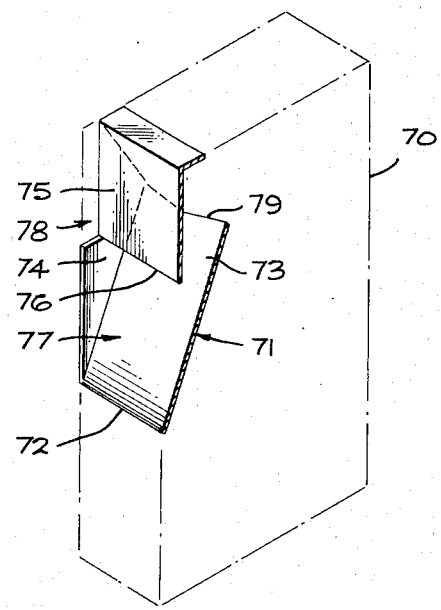

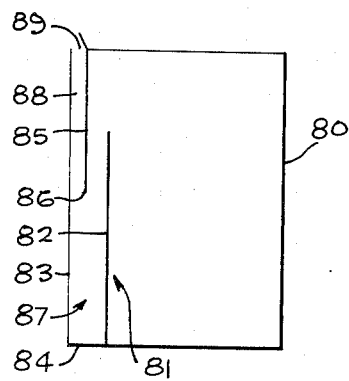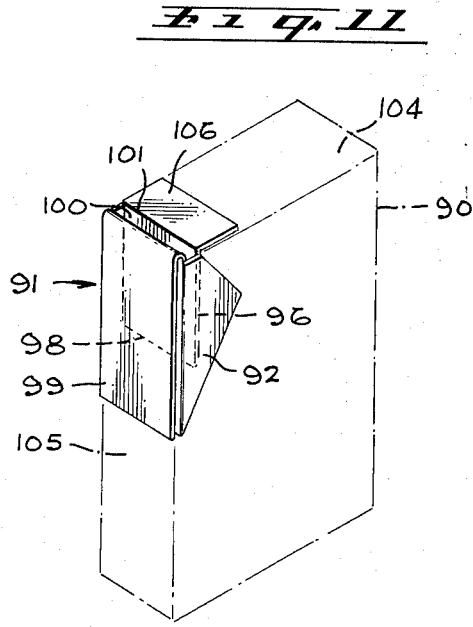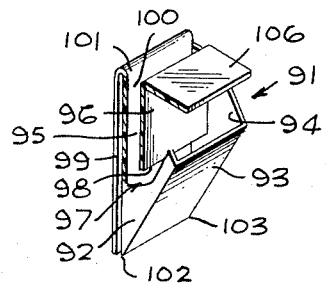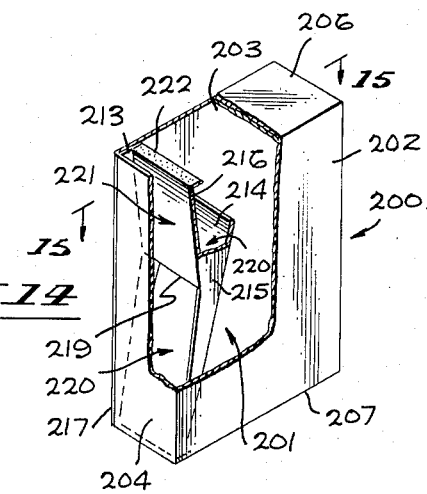

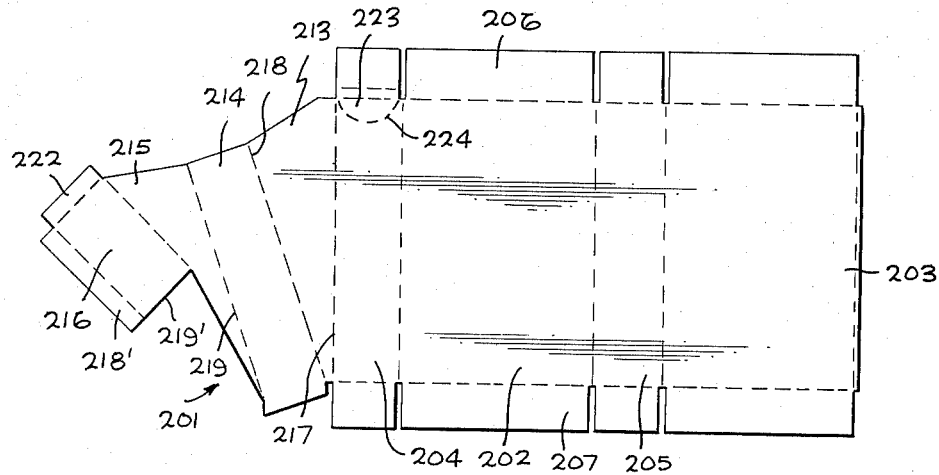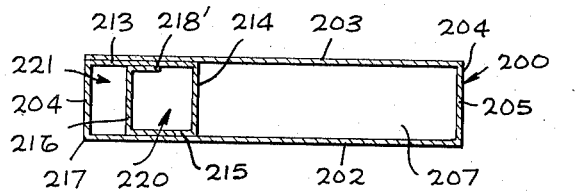

United States Patent Office 3,235,144
Patented Feb. 15, 1966

3,235,144
MEASURING DISPENSER FOR CONTAINERS
Richard A. Pitkin, 1401 N. Central, Glendale, Calif., and Stanley T. Beale, 1025 Cornell Drive, Burbank, Calif.
Filed June 22, 1964, Ser. No. 376,791
7 Claims. (Cl. 222—455)

The invention relates to packages and in particular a dispensing package capable of repeatedly dispensing a precise preselected volume of dry material from the box in which the material is customarily sold.

Among a rather large assortment of consumer goods currently merchandised in cardboard packages and similar packages are products, relatively concentrated in character, which are of loose, dry consistency merchandised as a rule in the form of granules, beads, flakes, and the like. Examples of ingredients of the kind under consideration include detergents, soap flakes, and even some food materials such as coffee. When products of these and comparable kinds are to be used, the user is almost invariably required to measure the quantity needed with an appreciable degree of care. If the product be a detergent for use in a dishwasher, detergents for this purpose are usually quite concentrated and measured out in quantities as small as half cups, quarter cups, and even by the tablespoon on some occasions. Where comparable detergents are used for washing machines, the quantity needing to be dispensed may be as much as a cup full at a time. Soap flakes are similarly measured. Measurement is needed not only to have the machinery or process perform successfully but also because using more than the required quantity of the material becomes unnecessarily wasteful and expensive, because of the relatively high prices of the concentrated products.

Measuring cups or other measuring receptacles are not always handy. Often if they are handy they may be of the wrong size. In our package conscious economy consumers are strongly drawn to the purchase of packaged goods which can be stored individually, often in limited space, and which can be quickly and conveniently used and then returned. Although some types of measuring and dispensing containers have been attempted, often for dispensing liquids as for example dispensing caps for alcoholic beverages, convenient, handy dispensing devices cheap enough to be included as part of the original consumer package have been a rarity.

It is therefore among the objects of the invention to provide a new and improved package device which is simple, convenient, and inexpensive and which can be readily used to dispense the contents of an ordinary small cardboard box.

Another object of the invention is to provide a new and improved fixed quantity dispenser box, the dispensing portion of which can be constructed simultaneously with the assembly of the box and which will in no way interfere with the customary methods of filling and closing the box.

Another object of the invention is to provide a new and improved fixed quantity dispenser which can be made separate from a box, which can be made as part of the box at the time of assembly or which may be an entirely separate unit, the dispenser however being simple, inexpensive and accurate, and also one which presents no problems to the average household user when making use of the device.

Still another object of the invention is to provide a new and improved fixed quantity dispenser device which requires no alteration in the size or shape of a conventional retail container and which causes no loss of available volume in the container.

Further included among the objects of the invention is to provide a new and improved fixed quantity dispensing package the design of which can be applied to a great variety of types and sizes of package and which is capable of being added to the manufacturer's package at the discretion of the manufacturer, the dispensing portion being capable of being die cut as a separate sheet from the same kind of sheet material as is used for the package, or die cut as part of the sheet material actually foldable into the form of the container.

Further included among the objects of the invention is to provide a new and improved fixed quantity dispensing accessory which can be constructed as a separate unit and then inserted into the package by the ultimate consumer for use with the package until it is depleted after which the accessory can be reused for additional packages of comparable varieties.

With these and other objects in view, the invention consists in the construction, arrangement and combination of the various parts of the device, whereby the objects contemplated are attained, as hereinafter set forth, pointed out in the appended claims and illustrated in the accompanying drawings.

FIGURE 5 is a digrammatic side sectional view showing the box of FIGURE 1 filled with material to be dispensed resting in an upright position.

FIGURE 6 is a view similar to FIGURE 5 showing the condition of the material as a measured fixed quantity is being dispensed.

FIGURE 7 is a view similar to FIGURES 5 and 6 showing the condition of the material after the measured quantity has been dispensed and a succeeding quantity is being measured.

FIGURE 8 is a side perspective view of a modified form of accessory in solid lines, showing the relationship of a box in broken lines.

FIGURE 9 is a side perspective view of still another form of the accessory in solid lines and with one side removed together with the suggestion of a box in broken lines.

FIGURE 10 is a side sectional diagrammatic view of another form of the invention.

FIGURE 11 is a side perspective view of the invention made up as a separate item for insertion into a conventional box or container there shown in broken lines.

FIGURE 12 is a side perspective view of the device of FIGURE 11 on the opposite side partially broken away to show the construction.

FIGURE 13 is a developed view of a form of the invention where the accessory is initially cut out as part of the box material.

FIGURE 14 is a side perspective view substantially broken away showing the device of FIGURE 13 in assembled condition.

FIGURE 15 is a transverse sectional view on the line 15—15 of FIGURE 14.

Figure 1:
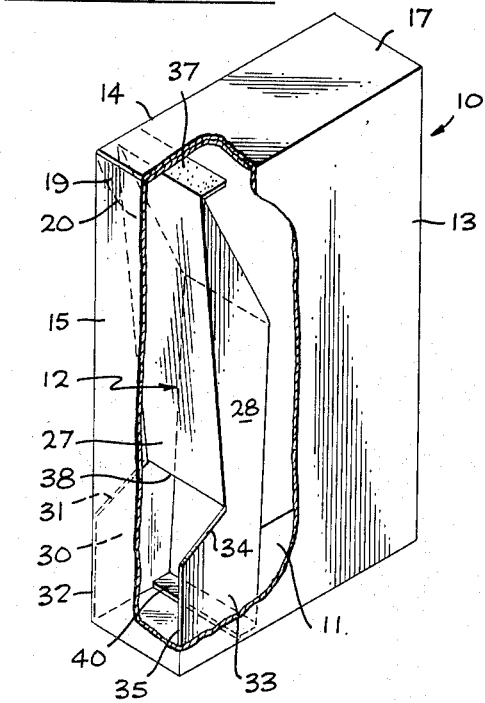
FIGURE 1 is a side perspective view substantially broken away showing a typical structure of the invention for measuring and dispensing a preset quantity of material.
Figure 2:
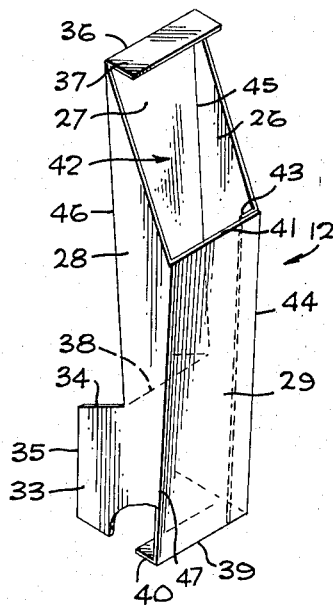
FIGURE 2 is a side perspective view of the measuring and dispensing accessory which is incorporated into the box of FIGURE 1.
Figure 3:
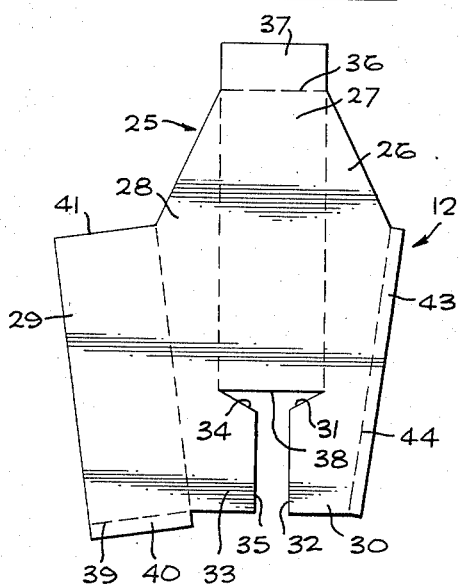
FIGURE 3 is a developed view of the sheet material from which the accessory of FIGURE 2 is formed.
Figure 4:
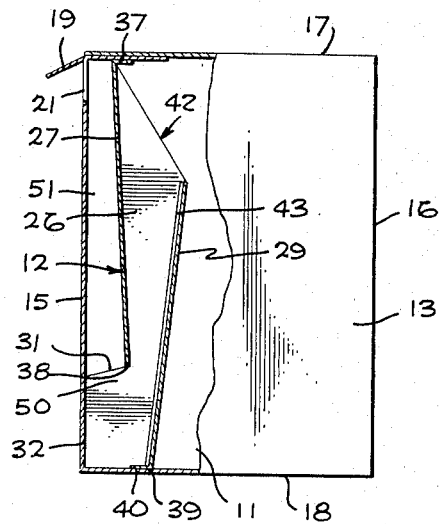
FIGURE 4 is a side elevational view substantially broken away of the device of FIGURE 1.

In an embodiment of the invention depicted in FIGURES 1, 2, 3, and 4 chosen primarily by way of illustration there is shown a box or container indicated generally by the reference character 10 which is substantially rectangular in shape. The box provides a chamber 11 and a dispensing accessory indicated generally by the reference character 12 is mounted in the box 10 at one side of the chamber 11 substantially as shown in FIGURES 1 and 2. For purposes of description and claiming the box 10 may be defined as consisting of side walls 13 and 14, end walls 15 and 16, a top wall 17, and a bottom wall 18. A flap 19 secured to the end wall 15 along a line 20 of perforations is adapted to be lifted outwardly as shown in FIGURE 4 to reveal a dispensing opening 21.

The accessory in the form of invention of FIGURES 1, 2, 3, and 4 comprises a section 25 of sheet material, as shown in FIGURE 3, which may be of the same material as that from which the box is made. Customarily this is cardboard. Other forms of inexpensive sheet material are contemplated and well within the scope of the invention.

The section 25 is made up of a first area 26, a second 27, a third area 28, and a fourth area 29. The first area 26 is substantially identical in size and configuration with the third area 28. The first area 26 has a flap 30 of predetermined height at the upper end of which is a sloping edge 31. A vertical edge 32 determines the end of the flap. Similarly the third area 28 has a flap 33 provided with a sloping upper edge 34 and a vertical end edge 35. The second area 27 has an upper transverse edge 36 to which is attached a glue flap 37. The second area 27 at its opposite end has a lower transverse edge 38 which is adapted to join with the innermost ends of the sloping edges 31 and 34 as shown in FIGURES 1, 2, and 4.

The fourth area 29 has a lower transverse edge 39 to which is attached a glue flap 40. At the opposite end is an upper transverse edge 41 which is located substantially below the upper transverse edge 36 of the second area 27 providing thereby in assembled form as shown in FIGURE 2 an opening indicated generally by the reference character 42. A glue flap 43 springing from an upright edge 44 of the first area 26 serves as a means for attaching the fourth area 29 to the first area 26. For convenience in description the second area 27 may be described as an upper baffle or partition and the fourth area 29 may be described as a lower baffle or partition. An upright edge 45 sloping to a degree joins the areas 26 and 27. An upright edge 46 joins the areas 27 and 28, and an upright edge 47 joints the areas 28 and 29.

Assembled as shown in FIGURE 2 the sundry areas form the accessory previously indicated by the reference character 12 and is ready for insertion in the box 10. This is preferably done when the box is initially assembled prior to filling. When the box is to be filled from the top the accessory is inserted into the chamber 11 and moved so that vertical end edges 32 and 35 are brought into engagement with the inside surface of the end wall 15. Proper spacing is achieved in this manner which is important to determine the volume of the fixed quantity which is to be dispensed. The glue flap 40 is thereupon fastened to the inside surface of the bottom wall 18 at the location indicated in FIGURES 1 and 4. Mounted as shown the accessory provides a pocket 50 and an exit passage 51. Thereafter the box is filled with a mass 52 of material which is usually a loose, dry material in relatively small particles, frequently granular or in the form of flakes. In filling boxes of this kind with the material described the material is never carried to a level completely filling the chamber 11. There is always a space 53 left at the top. This may be more or less depending upon the accuracy of the filling equipment. Irrespective of how full the box may be made initially, there is always some settling which leaves still more of the space 53. Moreover because of the nature of the accessory 12 mounted as shown the accessory does not occupy any needed volume of the chamber 11 because when the box is initially filled the pocket 50 is also filled as shown in FIGURE 5. Only the small volume of the exit passage 51 remains in the lower portion of the box unoccupied by the material.

In using the accessory and the box as a dispensing unit after having been filled as shown in FIGURE 5 it is necessary first to expose the dispensing opening 21 by breaking the line 20 of perforations and pulling out the flap 19. The box is then tilted as shown in FIGURE 6. The material which filled the pocket 50 then flows outwardly through the exit passage 51 and out through the dispensing opening 21. The quantity of material 52' which flows outwardly is determined by the location of the lower transverse edge 38. This cuts off the quantity of material at a selected volume and prevents any unneeded additional material from flowing out. The cut off is clearly shown in FIGURE 7 where all of the material 52' has flowed out and the exit passage 51 and pocket 50 are empty. Thereafter the box is set in upright position as shown in FIGURE 5 and an additional quantity of the material 52 again flows into the pocket 50. No matter how much more material fills the interior of the accessory above the pocket 50 only the selected volume will flow outwardly when the box is again tipped to the position of FIGURE 6. Moreover even though the box becomes almost empty the last of the material will still fall into a corner 54 as the second last quantity 52 is being dispensed and accordingly any remaining material in the box will then fall into the pocket 50 when the box is positioned upright as shown in FIGURE 5. The only variation from the dispensing of a full measure of the preset quantity occurs then when the very last of the contents of the box is dispensed at which time there may not be quite sufficient left to constitute the preset quantity. No material, however, will be permitted to remain in the box and hence the entire contents will be used.

The accessory is designed as one capable of being used within boxes of many different sizes. When the box is a big box of material such as the box 60 or the box 70 shown respectively in FIGURES 8 and 9, the accessory may need to take a different form such as the accessory 61 for the box 60 or the accessory 71 for the box 70.

In principle the accessory 61 for the box 60 is substantially the same as the accessory 12 described in connection with FIGURES 1, 2, 3, and 4. Here also the accessory consists of a first area 62, a second area 63, and third area 64, and a fourth area 65. A lower transverse edge 66 determines the volume of a pocket 67 and this communicates with an exit passage 68. An opening 69 provides admission to the pocket 67. Because the second area 63 slopes at an angle such as to join the box along the lower edge of the adjacent end wall the volume of the pocket 67 may be proportionately less than the volume of the pocket 50 described in connection with the first form of the invention. Adjustments in the volume of the pocket however can be made additionally by changing the level of the lower transverse edge 66. In fact the structure of the accessory is such that several expedients are available for establishing the volume of the selected pocket while at the same time providing an exit passage of ample proportions so that the material will flow freely and also providing that the material can freely flow down into the pocket.

Similarly in the accessory 71 employed for the box 70 the accessory is made up of a first area, cut away in FIGURE 9 for convenience in description, a second area 73, a third area 74, and a fourth area 75. On this occasion a lower edge 72 of the area 73 is joined by appropriate means to adjacent end wall of the box at a location substantially above the lowermost corner. As previously described there is provided by means of properly locating a lower transverse edge 76 of the area 75, a pocket indicated generally by the reference character 77. An exit passage indicated generally by the reference character 78 is also provided together with an opening 79 by means of which material of the box 70 will find its way into the pocket 77. Very large boxes are readily accommodated by an accessory like the accessory 71, since to build an accessory like the accessory 12 or the accessory 61 would require an unnecessary large amount of material which would serve no useful purpose. Moreover with respect to both forms of the device of FIGURES 8 and 9 no unnecessary amount of available volume within the box is taken away by the presence of the accessory because in the filling of the box of these forms of the invention the pocket is filled at the same time that the chamber within the box is filled.

Where a relatively large amount of material needs to be dispensed each time, an accessory indicated generally by the reference character 81 may be given the form shown in FIGURE 10 located as shown in a box 80. In this form a lower dividing baffle 82 is parallel to an end wall 83 of the box and attaches to a bottom wall 84 of the box. An upper dividing baffle 85 is also parallel to the end wall 83 and the lower dividing baffle 82. The lower transverse edge 86 is located relatively high above the bottom wall 84 thereby providing a pocket 87 of relatively large volume. As previously described an exit passage 88 communicates with a dispensing opening 89.

In FIGURES 11 and 12 is shown an accessory indicated generally by the reference character 91 which is constructed as a separate unit and adapted to be inserted into a box 90 to be used until the contents of the box is depleted and thereafter removed for use in another full box. In this form of the invention a first area 92 connects a second area 93 with a third area 94 substantially as previously described. A fourth area 95 closes the other side of the accessory but a fifth area 96 extends down into the interior of the accessory to determine the volume of the pocket 97 by the location of its lower transverse edge 98. An outer area 99 is coextensive with and spaced from the fourth area 95 as shown. An exit passage 100 is formed between the areas 95 and 96 and the outer end of the exit passage 100 defines the dispensing opening 101.

The material of the accessory 91 may be some relatively stiff commercially available synthetic plastic resin material which is inexpensive and which makes up into a relatively strong and stiff accessory. Relatively sharp corners 102 and 103 serve to punch an appropriate hole in a top wall 104 of the box 90, when the accessory is forced into position. While being forced into position the outer area 99 overlies the outer face of an end wall 105 thereby to guide the accessory while it is being forced into position. A flap 106 overlies the top wall 104 and helps position the accessory properly in its selected location during use. When used the box 90 is tilted in the same manner as described in connection with FIGURES 5, 6, and 7, and the material in the box flows into the pocket 97 in the same way keeping the pocket filled and ready for dispensing through the exit passage 100 and dispensing opening 101. After the box has been emptied the accessory is merely lifted out of the hole which has been made by its forceable projection into the box and is ready for reuse in another box.

And still another form of the invention illustrated in FIGURES 13, 14, and 15 an accessory 201 is made initially as an integral portion of the material forming a box 200. The box consists of side walls 202 and 203, end walls 204 and 205, a top wall 206, and a bottom wall 207. The accessory 201 is made up of a first area 213, a second area 214, a third area 215, and a fourth area 216. In this form of device an upright edge 217 of the end wall 204 is coincident with the adjacent edge of the first area 213, the areas 213, 214, 215, and 216 being die cut at the same time that the box is cut. The areas of the accessory are all joined together along upright edges 218, 219, and 220 respectively.

In assembling this form of device the area 213, which is larger than the area 215, is folded so as to lie in engagement with the side wall 203 as shown in FIGURE 15. The area 214 becomes the lower dividing baffle as shown in FIGURE 14 and the area 216 becomes the upper dividing baffle. The area 215 lies in face to face engagement with the side wall 202 as shown in FIGURE 15. It is expedient to glue the area 215 to the side wall 202 and the area 213 to the side wall 203. A glue flap 218' is glued in position against the inside face of the area 213. A lower transverse edge 219' of the area 216 helps to determine the volume of a pocket 220 which communicates with an exit passage 221. A glue flap 222 is helpful in establishing the proper outlet end of the exit passage 221, the glue flap 222 being fastened to the inside surface of the top wall 206 at the location shown in FIGURE 14. A flap 223 attached along a line 224 of perforations can be broken outwardly to open a dispensing opening communicating with the exit passage 221. Customarily the areas making up the accessory 201 are attached in the positions described before flaps forming the top wall 206 and bottom wall 207 are folded over and fastened in position. One or another of the last described walls is left open for filling the box with the selected material. In use the form of device of FIGURES 13, 14, and 15 measures and dispenses material in the same manner as described in connection with the first form of the invention, action of which is illustrated in FIGURES 5, 6, and 7.

From the foregoing description it will be apparent that the accessory, regardless of the form which it takes, can be made of substantially the same material as the box itself. This applies even with respect to the form of FIGURES 11 and 12 under circumstances where the box material is sufficiently stiff and strong. The accessory moreover is made of simple folds of sheet material which is inexpensive to manufacture. The manner of mounting makes a positive measuring device which is extremely easy to use with virtually no instruction. The accessory moreover is so cheap that it is disposable when the box is emptied and disposed of.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. In a preset quantity dispensing container comprising side, top, and bottom walls providing a chamber for material, the combination of a measuring and dispensing accessory comprising an upper dividing baffle of sheet material spaced from said side walls which extend in the same general direction and forming an exit passage, said baffle extending part way from the top wall toward the bottom wall, side edges of said upper dividing baffle being in engagement with the container and a lower transverse edge of said baffle being free and at a location closer to the bottom wall than to the top wall, a lower dividing baffle of sheet material extending part way between the bottom wall and the top wall, side edges of said lower dividing baffle being in engagement with the container, an upper transverse edge of said lower dividing baffle being spaced from the upper dividing baffle forming an opening therebetween and being at a location closer to the top wall than to the bottom wall, a lower portion of said lower dividing baffle and adjacent lower wall portions of said container below said lower transverse edge of the upper dividing baffle defining a pocket in communication with said exit passage, the lower transverse edge of said lower dividing baffle being in engagement with an adjacent wall at a location below and spaced from the lower transverse edge of the upper dividing baffle, an upper portion of said lower dividing baffle above said lower transverse edge in combination with a lower portion of the upper dividing baffle and adjacent wall portions above said lower transverse edge defining an inside pocket having a volume at least as great as the volume of said measuring pocket, said container having an outlet opening at a location adjacent the upper end of said exit passage for dispensing repeated equal quantities of material from said exit passage and said measuring pocket.

2. In a preset quantity dispensing container comprising sheet material in the form of side, top, and bottom walls providing a chamber for material, the combination of a measuring and dispensing accessory comprising a portion of said sheet material including an upper dividing baffle spaced from one of said side walls forming an exit passage, said baffle extending part way between the top wall and the bottom wall, side edges of said upper dividing baffle being in engagement with the container and a lower transverse edge of said baffle being free, a lower dividing baffle extending part way between the bottom wall and the top wall, side edges of said lower dividing baffle being in engagement with the container, an upper transverse edge of said lower dividing baffle located substantially higher than the lower transverse edge of the upper dividing baffle, said lower dividing bafle being spaced from the upper dividing baffle forming an opening therebetween, the lower transverse edge of said lower dividing baffle being in engagement with an adjacent wall at a location below and spaced from the lower transverse edge of the upper dividing baffle, a lower portion of said lower dividing baffle below said lower transverse edge of the upper dividing baffle forming with adjacent wall portions of the box a measuring pocket of predetermined volume in communication with said exit passage, an upper portion of said lower dividing baffle above said lower transverse edge in combination with a lower portion of the upper dividing baffle and adjacent wall portions above said lower transverse edge defining an inside pocket having a volume at least as great as the volume of said measuring pocket, said container having an outlet opening at a location adjacent the upper end of the exit passage for dispensing material from said exit passage and said measuring pocket.

3. In a preset quantity dispensing container comprising side, end, top, and bottom walls providing a chamber the combination of a measuring and dispensing accessory insert comprising an upper dividing baffle of sheet material adapted to form a constantly open exit passage, said baffle being adapted to extend part way between the top wall and the bottom wall, a lower transverse edge of said baffle being free, a lower dividing baffle of sheet material adapted in use to be located part way between the bottom wall and the top wall, an upper transverse edge of said lower dividing baffle being spaced from the upper dividing baffle forming an opening therebetween, the lower transverse edge of said lower dividing baffle being adapted to occupy a position close to an adjacent wall at a location below and spaced from the lower transverse edge of the upper dividing baffle, a front area for said accessory and lateral areas overlying side edges of said front area and said baffles, said upper dividing baffle having a position fixed with respect to said side areas, a lower portion of said lower dividing baffle below said lower transverse edge of the upper dividing baffle forming with said front area and said lateral areas a measuring pocket of predetermined volume in communication with said exit passage, an upper portion of said lower dividing baffle above said lower transverse edge in combination with adjacent areas of said insert defining an inside pocket in communication with said measuring pocket, flap means on said accessory being adapted to overlie exterior wall portions of the container in fixed position to limit insertion of the accessory therein.

4. In a preset quantity dispensing box comprising side walls, end walls, a top wall and a bottom wall in the form of a box of rectangular cross-sectional shape providing a chamber for loose dry material in relatively small particles, the combination of a measuring and dispensing accessory comprising an upper dividing baffle of a single thickness of sheet material spaced from one of said end walls forming an exit passage, said baffle extending part way from the top wall toward the bottom wall, an upper transverse edge of said baffle being in engagement with the top wall at a location spaced from said one end wall, side edges of said upper dividing baffle being in engagement with respective side walls of the box, and a lower transverse edge of said baffle being free, an imperforate lower dividing baffle of sheet material extending part way between the bottom wall and the top wall, side edges of said lower dividing baffle being in engagement with respective side walls of the box, an upper transverse edge of said lower dividing baffle being at a location substantially higher than the lower transverse edge of the upper dividing baffle and being spaced from the upper dividing baffle forming an opening therebetween, the lower transverse edge of said lower dividing baffle being in engagement with an adjacent wall at a location below and spaced from the lower transverse edge of the upper dividing baffle, a lower portion of said lower dividing baffle below the lower transverse edge of the upper dividing baffle forming with wall portions of the box a measuring pocket of predetermined volume in communication with said exit passage, an upper portion of the lower dividing baffle above said lower transverse edge in combination with adjacent wall portions and a lower portion of the upper dividing baffle defining an inside pocket having a volume at least as great as the volume of said measuring pocket, said box having an outlet opening at a location adjacent the upper transverse edge of the upper dividing baffle for dispensing material from said exit passage and said measuring pocket.

5. In a preset quantity dispensing box comprising side walls, end walls, a top wall and a bottom wall in the form of a box of rectangular cross-sectional shape providing a chamber for loose dry material in relatively small particles, the combination of a measuring and dispensing accessory comprising an upper dividing baffle of a thickness of sheet material spaced from one of said end walls forming an exit passage, said baffle extending part way from the top wall toward the bottom wall, an upper transverse edge of said baffle being in engagement with the top wall at a location spaced from said one end wall, side edges of said upper dividing baffle having fixed positions with respective side walls of the box in substantially right angular relationship and a lower transverse edge of said baffle being free, a lower dividing baffle of imperforate sheet material extending part way between the bottom wall and the top wall, side edges of said lower dividing baffle being in engagement with respective side walls of the box in a substantially right angular relationship, side areas for said accessory overlying and in engagement with side edges of the baffles and having positions fixed relative to respective side walls of the box, edges of said side areas being in engagement with an adjacent side wall portion of the box whereby to fix the location of said accessory relative to said side wall portion, an upper transverse edge of said lower dividing baffle being spaced from the upper dividing baffle forming an opening therebetween, the lower transverse edge of said lower dividing baffle being in engagement with an adjacent wall at a location below and spaced from the lower transverse edge of the upper dividing baffle, a lower portion of said lower dividing baffle forming below said lower transverse edge with the walls of the box, a measuring pocket of predetermined volume in communication with said exit passage, an upper portion of said lower dividing baffle above said lower transverse edge in combination with a lower portion of the upper dividing baffle and adjacent wall portions defining an inside pocket having a volume greater than the volume of said measuring pocket, said box having a constantly open outlet opening of fixed area at a location adjacent the upper transverse edge of the upper dividing baffle for dispensing material from said exit passage and said measuring pocket.

6. A fixed quantity dispenser container comprising side, end, top, and bottom walls providing a chamber and a measuring and dispensing accessory housed within said chamber and forming an integral part of said container, said accessory comprising a section of the material of which said container is constructed and including a first area adapted in assembled condition to lie within the container, a second area forming a baffle joined at one of its upright edges to the first area and having a second upright edge parallel to and spaced from said one upright edge, a third area having one upright edge joined to the second upright edge of the second area, a second upright edge of said third area having a length less than said one upright edge of the third area, and a fourth area forming an upper baffle having a first upright edge coincident with and joined to the second edge of said third area, said third area in assembled condition lying in a position opposite said first area, said first, second, and third areas together with the adjacent wall portion of the container forming a pocket of predetermined volume closed at the bottom thereof, one of said areas at one edge being joined to and part of a wall portion of the container, the upper edge of said second area being spaced from said top wall and forming an entrance to said pocket, said fourth area having a second upright edge spaced from and parallel to the first upright edge whereby said fourth area extends across said pocket at a location between said second area and the adjacent end wall and to a position part way down from the top thereby to define an exit passage from said pocket.

7. A fixed quantity dispenser container comprising side walls, end walls, a top wall, and a bottom wall in the form of a box of rectangular cross-sectional shape and providing a chamber for loose dry material in relatively small particles, and a measuring and dispensing accessory housed within said chamber and forming part of said box, said accessory comprising a section of the material of which said box is constructed and including a first area having a first upright edge, said first area being adapted in assembled condition to lie against an adjacent side wall with a second upright edge at a location removed from said first upright edge, a second area forming a baffle joined at one of its upright edges to the second upright edge of the first area and having a second upright edge parallel to and spaced from said one of its upright edges, a third area having one upright edge joined to the second upright edge of the second area, a second upright edge of said third area having a length less than said one upright edge of the third area, and a fourth area forming an upper baffle having a first upright edge coincident with and joined to the second edge of said third area, said third area in assembled condition lying in a position against the side wall opposite said first area, said first, second, and third areas together with the adjacent end wall forming a pocket of predetermined volume closed at the bottom thereof, one of said areas at one edge being initially joined to and part of a wall portion of the box, the upper edge of said second area being spaced from said top wall and forming an entrance to said pocket, said fourth area having a second upright edge spaced from and parallel to the first upright edge and being joined to the top and to the adjacent side wall whereby said fourth area extends across said pocket at a location between said second area and the adjacent end wall and to a position part way down from the top wall thereby to define an exit passage from said pocket, said box having dispensing opening adjacent the top of said exit passage.

References Cited by the Examiner

UNITED STATES PATENTS

| | | | |
|---|---|---|---|
| 2,061,061 | 11/1936 | Conn | 222—455 |
| 2,092,983 | 9/1937 | Milward | 222—456 |
| 2,393,262 | 1/1946 | Percy | 222—455 |
| 2,750,082 | 6/1956 | Kowal | 222—455 |
| 2,782,965 | 2/1957 | Campbell | 222—455 |
| 2,853,213 | 9/1958 | Buehlig | 222—455 |
| 2,898,013 | 8/1959 | Hebert | 222—455 |
| 3,145,885 | 8/1964 | Vlock | 222—455 |

FOREIGN PATENTS 562,012  11/1914  Belgium.

M. HENSON WOOD, JR., *Primary Examiner.*

LOUIS J. DEMBO, *Examiner.*

Notice of Adverse Decision in Interference

In Interference No. 95,824 involving Patent No. 3,235,144, R. A. Pitkin and S. T. Beale, MEASURING DISPENSER FOR CONTAINERS, final judgment adverse to the patentees was rendered Jan. 30, 1969, as to claims 1, 2, 4 and 5.

[*Official Gazette August 5, 1969.*]